United States Patent [19]

Brown et al.

[11] Patent Number: 5,702,602

[45] Date of Patent: Dec. 30, 1997

[54] FILTER SYSTEM WITH ENVIRONMENTALLY FRIENDLY FILTER CARTRIDGE

[75] Inventors: Gene W. Brown; Jeffrey E. D. Rogers, both of Kearney, Nebr.

[73] Assignee: Baldwin Filters, Inc., Kearney, Nebr.

[21] Appl. No.: 575,515

[22] Filed: Dec. 20, 1995

[51] Int. Cl.$^6$ .................................................. B01D 35/34
[52] U.S. Cl. ........................... 210/342; 210/440; 210/441; 210/450; 210/456; 210/458
[58] Field of Search .................................. 210/354, 356, 210/437, 440, 441, 443, 444, 450, 455, 456, 457, 342, 458, 315; 55/502

[56] References Cited

U.S. PATENT DOCUMENTS

| | | | |
|---|---|---|---|
| 2,925,913 | 2/1960 | Wheeler | 210/444 |
| 3,270,884 | 9/1966 | Bremer | 210/443 |
| 5,399,264 | 3/1995 | Pulek et al. | 210/450 |
| 5,445,734 | 8/1995 | Chen | 210/444 |

FOREIGN PATENT DOCUMENTS

| | | | |
|---|---|---|---|
| 1095471 | 6/1955 | France | 210/444 |
| 1107885 | 8/1984 | U.S.S.R. | 210/354 |

*Primary Examiner*—Matthew O. Savage
*Attorney, Agent, or Firm*—Leydig, Voit & Mayer, Ltd.

[57] ABSTRACT

A filter system using a filter cartridge adapted for disposal in an environmentally acceptable manner. The filter cartridge has no metal parts, and thus avoids the use of a metal center tube, or a center tube of any configuration. The housing itself carries a permanent center tube. A sealing arrangement formed between the filter cartridge and the housing provides a radial seal isolating the outer periphery of the filter cartridge from the remainder thereof. Filter and caps are in the lower pressure downstream zone, and thus any axial forces imposed on the filter place the filter media in tension to avoid the imposition of crushing loads on the unsupported filter.

21 Claims, 7 Drawing Sheets

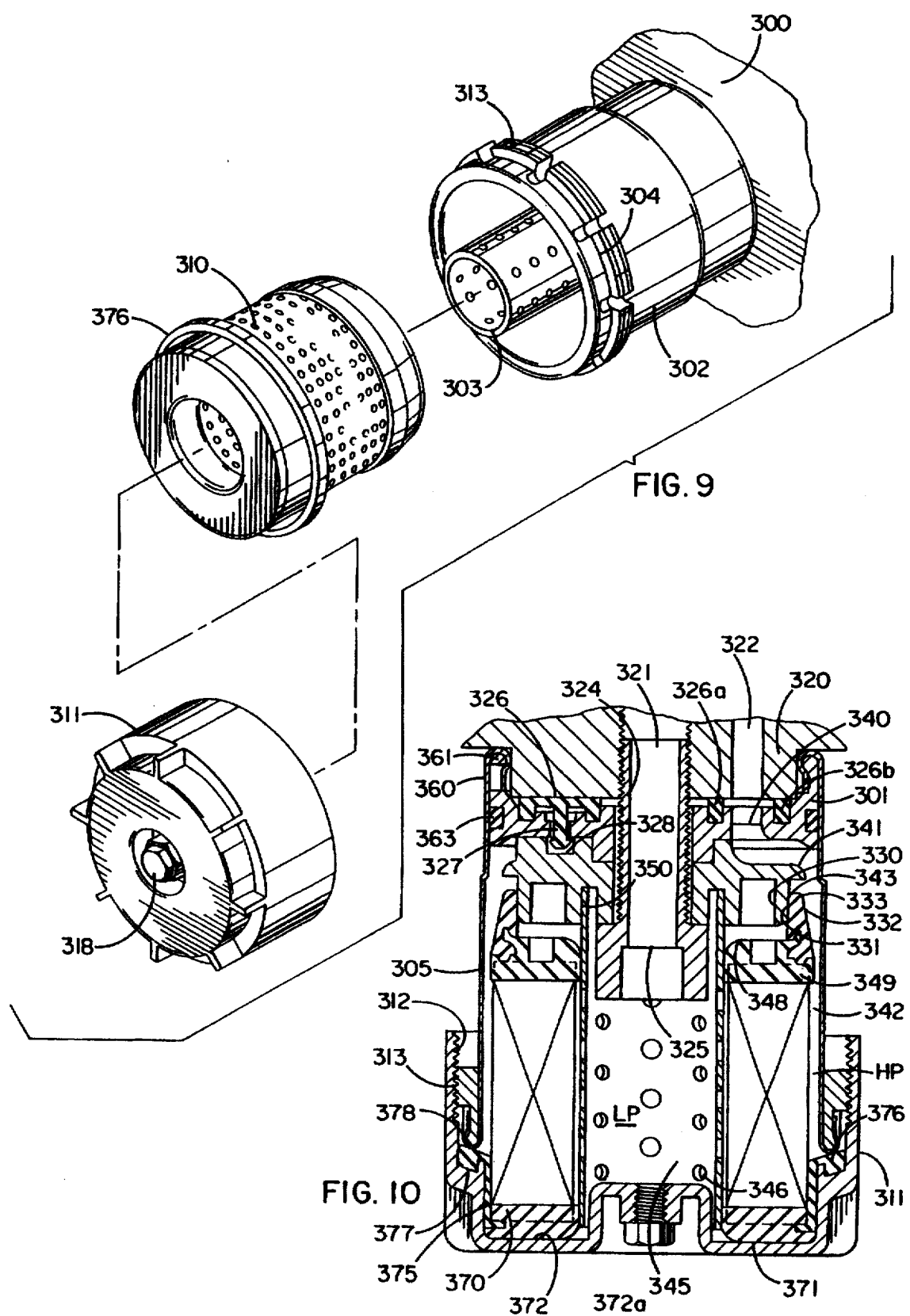

FILTER SYSTEM WITH ENVIRONMENTALLY FRIENDLY FILTER CARTRIDGE

FIELD OF THE INVENTION

This invention relates to filters, and more particularly to a filter system designed to use replaceable filter cartridges.

BACKGROUND OF THE INVENTION

A very common use for such filters is in the lubrication system of the standard internal combustion engine, e.g., automotive engines, truck or heavy equipment engines, and stationary power sources. The invention, however, has broader applicability, and can also be used in hydraulic, fuel and air filter applications.

In all of these applications, the filter must be changed periodically. Taking the lubrication system example, in an automotive application, the oil filter is typically changed every several thousand miles. There are a limited number of reusable oil filter types available or in use, but in most high quality lubrication systems, disposable spin-on oil filters are used, and these can create a disposal problem.

In the early days of filters, it had been common to utilize cartridge type oil filters which fit into a removable housing. The housing was removed from the oil filter mount on the engine, the cartridge removed from the housing, the housing cleaned, a new cartridge installed, and the housing with new cartridge then replaced on the engine. Cartridges for filters of that type usually included a cellulosic filtering medium and a supporting center tube, typically of metal mesh or expanded metal. Oftentimes, such cartridges also included an exterior metal support. The metal supports, and particularly the center tube (or outer wrap), were needed to prevent the filter from being crushed by the pressure generated in the lubricant being filtered. Differential pressures in an automotive hydraulic system can rise substantially at engine start-up, and particularly during malfunctions, such as a plugged filter malfunction (due, for example, to water or excess engine wear metals in the oil), and can reach 200 psi or more.

In summary, conventional practice in the past required the use of a support tube in combination with cellulosic filters. The cellulosic filter provided good filtering capability, and the metallic supporting structure provided the necessary rigidity and differential pressure withstanding capability. Disposal of the cartridge was complicated by the metal supporting structure which made crushing impractical and complete incineration impossible.

More modern automobiles have migrated to the spin-on filter. While the spin-on filter is typically more expensive, and creates a greater disposal problem, the simplicity of removing an old filter, then spinning a new one on in its place has driven the industry in that direction. The spin-on filter not only has the typical cellulosic filter elements, but also has an external shell of sheet metal, a center supporting tube, a threaded base plate and all the necessary structure to hold the filter in place and keep it from being crushed. After it is used, the entire spin-on filter, metal shell and all, must be discarded.

Environmental regulations, the limited availability of landfills, and the greater awareness on the part of the public with respect to landfill pollution have created the need for an oil filter of the type which can be safely disposed of in an environmentally acceptable way. Certainly the canister type spin-on filters have their difficulty on this issue, because they have a substantial metal content, along with the paper content, gasket content, and residual oil. Even the older variety of cartridge type filters have disposal problems, because they contain both metallic parts (for support) as well as the cellulosic parts (for filtering).

Attempts have been made to produce an environmentally disposably acceptable filter, (i.e., an environmentally friendly filter) but they have also suffered their drawbacks. For example, it has been proposed to utilize a filter cartridge with no metallic center support tube, and build the support tube into the filter housing. However, these approaches have been less than satisfactory for a number of reasons.

One of the problems is encountered when using a radial seal as the main seal between the filter and the outside world. This problem involves the difficulty of disassembling the filter housing in order to change the cartridge. The sealing arrangements have been such that an unusual amount of torque is needed to detach the cover from the housing. Even more significantly, while the center support tubes have provided protection from crushing the filter paper elements in the radial direction, there are significant pressure drops experienced along the axis of the filter. Those pressure drops can be large enough to either unseat the filter and cause leakage around the gasket at one or the other end cap, or to begin to compress or crush the filter along its axis. Thus, in these attempts, while they apparently have provided a filter cartridge with no metallic parts, the filters themselves have been less desirable than standard types because of these difficulties.

It is possible, by making certain compromises, to compensate for the lack of strength of an unsupported filter cartridge by using bypass valves either in the filter or in the engine. The function of a bypass valve is to respond to a pressure differential buildup caused, for example, by a plugged filter, and bypass oil around the filter. In effect, the bypass valve limits pressures in the system, but at the cost of passing unfiltered oil to the equipment. That might be acceptable in an automotive application, but in other applications it is completely undesirable. For example, a pressure relief valve is undesirable in those cases where passing unfiltered fluid might do permanent damage to the machinery being protected. Typical examples are a diesel fuel system or a hydraulic system. In those, it is considered preferable to allow the filter to plug to protect the equipment from a catastrophic and costly failure. To withstand the pressures as the filter plugs in such systems, the filter cartridge must have adequate structural support, which eliminates the possibility of using the unsupported filter cartridges which have been available in the past.

SUMMARY OF THE INVENTION

In view of the foregoing, it is a general aim of the present invention to provide a filter system employing a filter cartridge which is crushable or burnable for disposal purposes, but which has operating characteristics capable of reliably meeting the stringent requirements normally associated with metal housed spin-on filters. Further in that regard, an object is to provide such a filter system which does not require the use of a relief valve to limit pressure in the system. The invention can be used in relief valve systems, but the relief valve is not necessary to protect the filter.

It is an object of the present invention to provide a filter system using a filter cartridge having no metallic supporting elements, and adapted to cooperate with a filter housing such that the compressive forces on the filter element are limited and are tolerable.

Further in that regard, it is an object to provide a metallic center tube in the filter housing which is capable of supporting the filter element in the radial direction to prevent radial crushing. In conjunction with that object, it is a further object to control pressures within the housing, and use the filter element in such a way that any axial forces on the filter element primarily place the filter element in tension (where the filter media has significant strength) rather than in compression (where it has much less strength).

A resulting object is to impose loads on the filter cartridge which it is capable of withstanding, such as compressive loads radially where the filter element is supported, and axial tension loads which the filter is more capable of supporting than axial compressive loads.

It is a detailed object of the invention to provide such a filter assembly in both single flow and dual flow types.

A further detailed object is to provide such a filter assembly which is not only environmentally acceptable, but which is user friendly. In that respect, it is an object to provide a filter cartridge which can be installed in only one way, and in a way which assures that the filter assembly will be properly gasketed when assembled. In other words, an object is to make changing of the filter substantially foolproof so that untrained individuals can reliably accomplish a filter change.

Other objects and advantages will become apparent with reference to the following detailed description when taken in conjunction with the drawings in which:

BRIEF DESCRIPTION OF THE DRAWINGS

FIG. 9 is an exploded perspective view, similar to FIG. 1, of yet another embodiment of the present invention intended primarily for first-fit or OEM applications;

FIG. 10 is a sectional view in elevation through the center of the filter system of FIG. 9;

Figure 1:
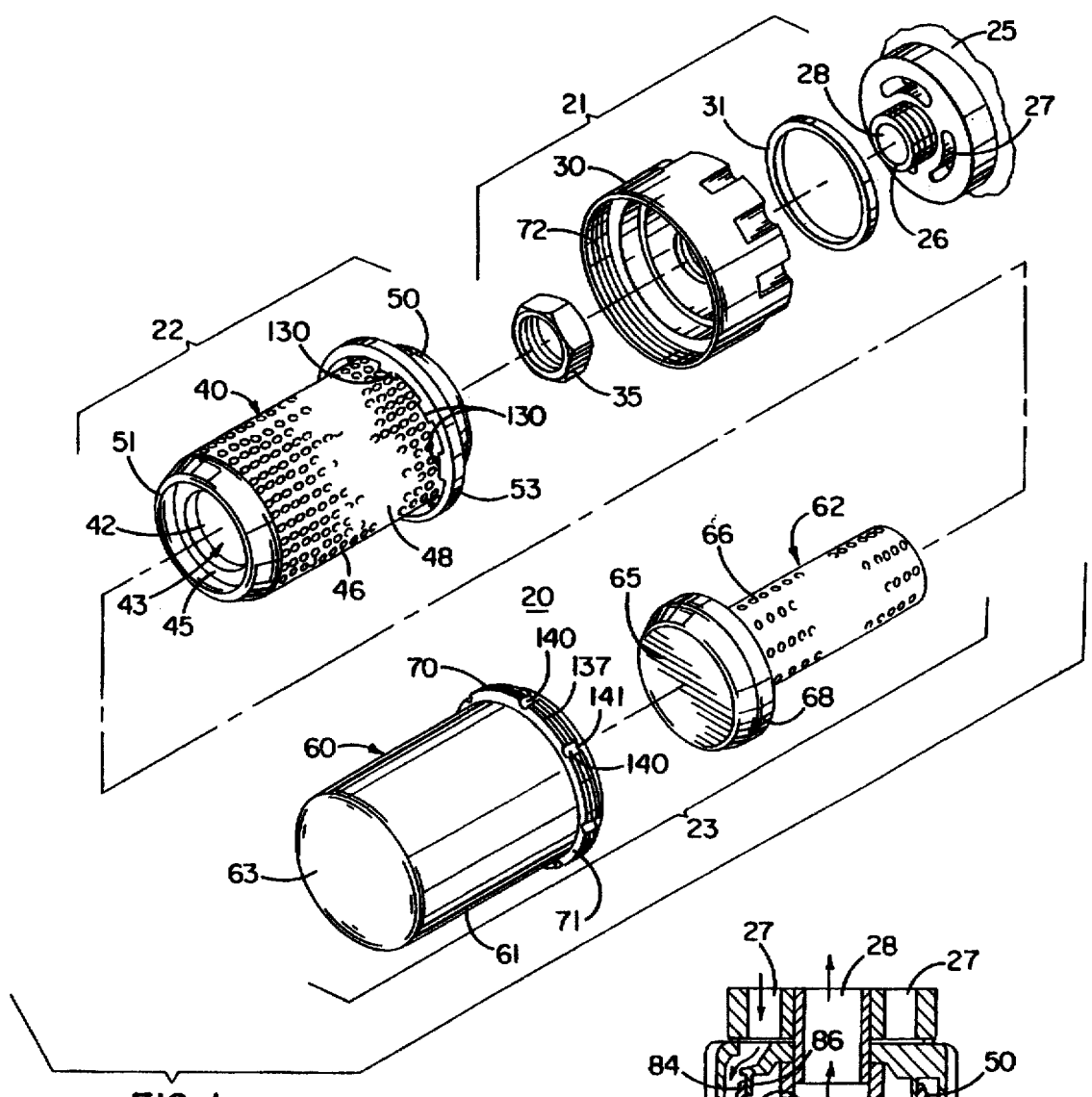
FIG. 1 is an exploded perspective view showing a filter system constructed in accordance with the present invention and particularly suited for retrofit to existing equipment.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

As shown in the drawings for purposes of illustration, the invention is embodied in a filtration system 20. The filtration system 20 of the preferred embodiments is a lubricant filter system, such as an oil filter system for an internal combustion engine. As noted above, the invention is fully applicable to other filtering applications, such as fuel filters, hydraulic filters, and air filters. The description of the preferred embodiment in connection with an oil filter system will, however, be an adequate description of the invention for application of the principles of the invention to these other filtering applications.

Figure 2:
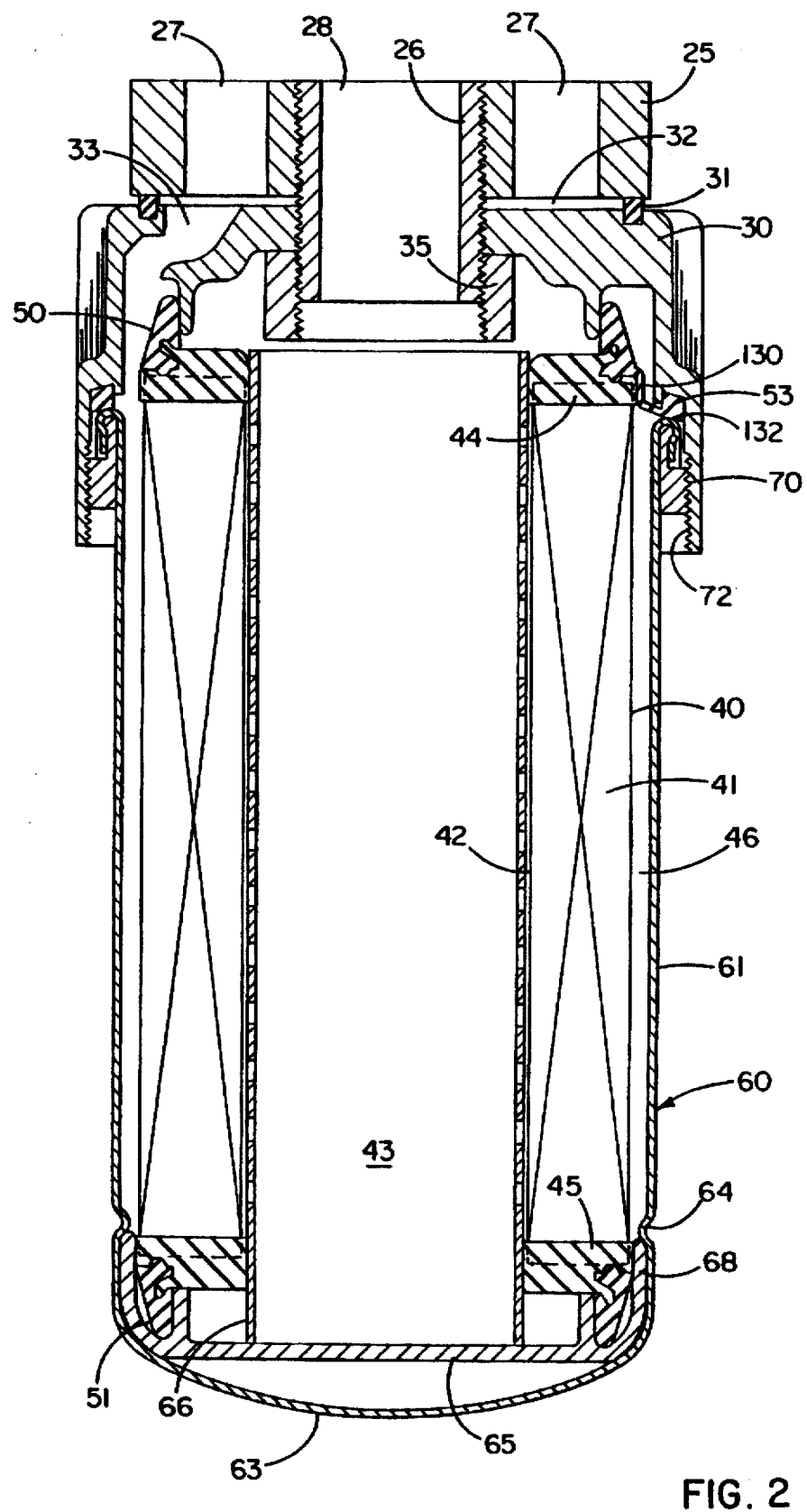
FIG. 2 is a cross-sectional view in elevation through the center of the filter of FIG. 1.

Turning then to the drawings, FIG. 1 shows the filter system 20 in exploded perspective view, as including three main groupings, a set of engine mounted components 21, a replaceable filter cartridge 22, and a removable housing 23. An internal combustion engine is schematically illustrated at 25, having a spud 26 for normal attachment of a spin-on filter. Arcuate oil inlet ports 27 provide a supply of oil into the filter, and an internal passage 28 in the spud 26 provide a port for oil flow back to the engine. Mounted to the engine is a filter base plate 30 associated with gasket 31. The assembled relationship of those elements is best illustrated in FIG. 2 which shows the gasket 31 sealing an internal chamber 32 which provides a path for oil flow from the inlet ports 27 to a filter inlet 33. The base plate 30 is permanently secured to the engine by internal threads, and a lock nut 35 prevents the inadvertent loosening of the base plate.

The filter cartridge 22 is shown in perspective in FIG. 1 and in sectioned elevation in FIG. 2. It will be seen that the cartridge includes a cylindrical filter 40 comprising filter media 41 arranged in a cylinder and defining an inner cylindrical wall 42 forming an internal chamber 43 and an outer periphery 46, also cylindrical. It will be appreciated from an inspection of FIGS. 1 and 2 that the filter cartridge contains no supporting center tube that must be discarded with the media. The filter media is preferably cellulosic, in the form of treated paper of relatively conventional pleated construction. Other forms of filter media are also usable.

The absence of a disposable center tube is significant in that it eliminates the need for a metallic filter support. The disposable center tube-free construction, along with the gasket and end cap construction (to be described below) which are of environmentally acceptably disposable materials, provide for a filter cartridge which, after use, can be readily discarded. As one alternative, for example, the filter cartridge can be incinerated, since it contains no toxic materials and no non-incineratable metal. As a further alternative, the filter can be crushed, which not only removes oil residue, but also substantially reduces the volume. The crushable filter cartridge, after being crushed to remove oil and reduce its volume, can be incinerated or deposited in a landfill. The disposable center tube-free construction is of significance in both of the disposal alternatives.

For the purpose of securing and sealing the ends of the filter, end caps 44, 45 form continuous ring-like discs secured to the filter media at each end of the filter. Embedded in the end caps 44, 45 of FIGS. 1 and 2 are radial seal gaskets 50, 51 whose structure and functionality will be described in greater detail below. Suffice it to say for the moment that the end caps 44, 45 are preferably of epoxy formed in a molding operation in which the epoxy attaches to both the pleats of the filter, and attachment surfaces of the gasket. The overall appearance is best illustrated in FIG. 1 which shows the filter 40 and radial seal gaskets 50, 51 attached by end caps (only end cap 45 appears in FIG. 1) and having an unsupported cylindrical wall 42 which forms inner chamber 43. The outer surface 46 is also cylindrical, and as illustrated in FIG. 1 is best covered by a paper overwrap 48. As will be described in greater detail below, the filter assembly 22 also carries an integrally attached housing gasket 53 which is positioned at one end of the filter to make the filter insertable into the canister in one direction only, and which provides an automatically positioned gasket for sealing the filter housing.

In the currently preferred embodiment of the invention, the end caps are formed of a moldable material, such as epoxy, and the radial seal gaskets are of preformed rubber secured in the end caps. It is, however, recognized that the endcaps and radial seal gaskets can be made of the same material, preferably in mold elastomeric potting compound such as polyurethane, an epoxy, plastisol or another moldable, flexible material. In the broader sense of the invention, both types of end structures, end caps and sealing gaskets, are contemplated.

Further details of the filter cartridge will be emphasized below. For the moment, attention will be directed to the housing into which the filter is inserted and by which the filter is associated with the base plate. It will be seen in FIGS. 1 and 2 that a metallic housing 60 comprises a formed sheet metal shell 61 and contains an inner support tube assembly 62 positioned in the closed end 63 of the shell 61 and held in place by a continuous bead 64 formed around the periphery of the shell 61. The shell 61 is preferably a drawn metal canister; it is currently preferred to draw the shell of steel approximately 0.055" in thickness. Aluminum would also be useful, but since the shell is a removable and reusable part, it is preferred to use steel. The support tube assembly 62 includes a base plate 65 having a perforated tube 66, preferably of metal, but also possibly of plastic, attached securely to the base plate 65. The attachment can be by press fitting, welding, gluing, or the like. The currently preferred tube is of perforated aluminum and is glued to the base plate. The base plate has a formed edge at the periphery thereof which presents a cylindrical flange 68 of a diameter which fits snugly into the cylindrical shell 62. A bead 64 is formed to secure the base plate 65 firmly in the base 63 of the shell 61. The permanent center tube 66 is thereby rendered integral with the housing 60.

Thus, in normal operation, and assuming the filter is disassembled, in order to install a clean filter on the engine, one first takes the canister 60 with internal integrally fixed center tube 66, and inserts a filter cartridge 40 over the center tube and into the canister. The partly assembled unit is then brought into position opposite the base plate 30, such that a ring 71 having external threads 70 and secured to the canister 60 near the open end thereof engages complementary threads 72 in the base member. The filter canister is then rotated to cause the threads 70, 72 to engage, ultimately compressing the gasket 53. With the gasket so compressed, the filter is secured in place, and the unit can be operated.

Figure 3:
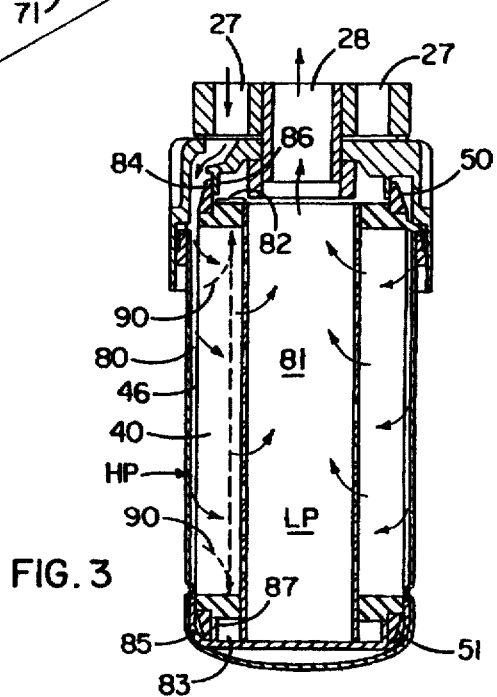
FIG. 3 is a diagram illustrating flows and pressures within the filter of FIG. 1.

Turning to FIG. 3, certain significant aspects of the interrelationship between the filter cartridge 40 and the filter assembly 20, will now be described. Radial seals 50, 51 were briefly referred to above. As will now be explained, those seals are important in imposing loads on the filter cartridge 40 in directions which the filter media 41 is likely to withstand, and by preventing the application of forces which are likely to destroy or deform the filter media. It will be seen in FIG. 3 that the filter cartridge 40 separates an outer upstream high pressure chamber 80 in the canister (designated HP) from a lower downstream pressure section 81 (designated LP) located in the bore of the filter cartridge. The solid line arrows show oil entering the filter through the inlet 27 for flow into the chamber 80, defined between the wall of the canister 61 and the outer periphery 46 of the filter cartridge. It will be apparent to those skilled in this art that the chamber 80 thus contains the highest pressure (the upstream pressure) in the system. Lubricant flows through the filter as indicated by the arrows and through perforations in the supporting center tube to enter the internal downstream chamber 81 where it flows through the port 28 back to the engine, as indicated by the solid arrows. Because the flow direction is from outside to inside, the pressure within the chamber 81 is at a lower pressure than that in chamber 80. It will also be appreciated that the lower pressure is present at the portion of the end cap bracketed at 82, and in the small chamber 83 adjacent the end cap 45. By placement of the radial seals at or very near the outer periphery of the filter element, the high pressure zone is restricted to the outer periphery 46, and all other portions of the filter are at a lower pressure. Thus, the lips 84, 85 of the radial seals are pressed firmly against mating flanges 86, 87 of the housing, enhancing the seal in that area.

Even more significantly, however, the fact that the end caps in areas 82, 83 are at a lower pressure, imposes a tensile force indicated by the dotted line arrows 90 on the filter media. The high pressure is applied at the outer periphery, and a lower pressure is applied at the end caps, which in effect, puts the filter media in tension as indicated by the arrows 90. Since the filter media is quite capable of resisting reasonably substantial tensile forces, and since the filter is restrained from significant axial expansion, due to positioning of the end caps against or near elements of the housing, the filter media will withstand these tensile forces.

This capability is significant when compared to certain prior designs which allow the high pressure to be applied to at least a portion of the end cap. That high pressure imposed at a portion of the end cap, usually finds an opposing lower pressure at a different portion of an opposite end cap, which results in a compressive force on the filter media. That force, which represents a crushing force on the axially unsupported filter media, can in many cases unseat the filter or indeed deform or begin to crush the filter, rendering the filtering system inoperative as a filter.

By virtue of deploying radial seals at the outer periphery in accordance with the present invention, the pressure differential from the outer periphery to the end caps is always controlled to place the filter media in tension, and a far superior and more reliable filter results.

With that understanding of the functionality, the structure which achieves that functionality will now be more fully described in connection with FIG. 2 and the enlarged sectional views of FIGS. 4 and 5. Referring first to the upper radial seal 50 (FIGS. 2 and 4), it will be seen that the seal comprises an axially extending flexible flange 100, of a suitable gasket material. The gasket material is preferably incineratable without creating toxic substances, and also suitable for landfill disposal. Nitrile rubber is currently the preferred material, configured as a preformed elastomeric ring with attachment flanges potted into the end caps. It is also expected, however, to form the gasket ring itself of a suitable flexible potting material, allowing the concurrent formation of the end caps and gasket. However, in the preferred construction, the end caps are of a reasonably stiff potting compound which joins the flexible gasket to the pleats of the paper filter. The manner in which a potted end seal with integral gasket can be formed is described more fully in U.S. Pat. No. 5,484,466. The technique is altered in accordance with the present invention by eliminating the Plastisol potting compound which may produce undesirable combustion products, and using an environmentally acceptable potting compound in its place. We currently prefer the use of a two-part epoxy produced by Hardmann and identified by their references 20216A and 13403B. It is anticipated that the potting material can also be used to form the gasket itself, eliminating the need for the separate preformed elastomeric gasket 50.

Figure 4:
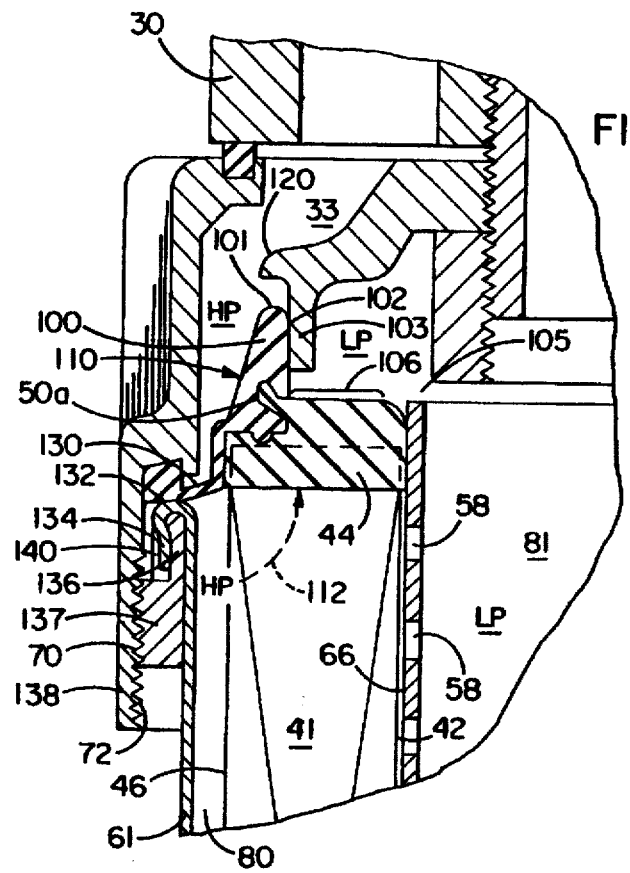
FIG. 4 is an enlarged cross-sectional view of the filter of FIG. 2 showing the oil inlet and filter cartridge radial seal at the inlet end.
Figure 5:
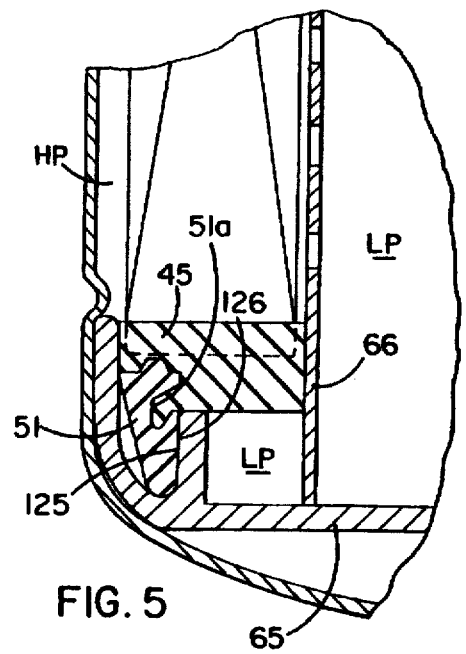
FIG. 5 is an enlarged view, similar to FIG. 4, but showing the radial seal at the opposite end of the filter cartridge.

It will be seen upon reference to FIGS. 4 and 5 that the potting operation partly encapsulates the margins of the pleated paper, and partly surrounds and encapsulates an irregular surface 50a, 51a of the associated gasket. By virtue of the former connection, the end cap is securely fixed to the pleats, and holds the shape of the filter. By virtue of the second connection, the gasket is integrally connected to the end cap and thus to the pleated paper portion of the filter. The shape of the irregular potting compound connection to the gasket, 50a and 51, provide a mechanical interlock of the gasket to the potting compound that holds them together in both a radial and an axial direction.

The radial seal 50 preferably has a rounded or beveled nose 101 to facilitate insertion of the filter into the end cap, and a substantially flat sealing surface 102. The sealing surface 102 forms a continuous cylindrical surface sized and adapted to mate with the outside of a metal flange (alternatively referred to herein as an upstanding cylindrical wall) 103 which is formed as an element of the base plate 30. It will be recalled that the area between the cylindrical shell 61 and the outer periphery 46 of the filter cartridge is a high pressure zone, and in FIG. 4 that zone is designated as HP. It will also be recalled that the cylindrical cavity 81 within the filter cartridge 40 and to which oil flow communicates by way of ports 58 is at a lower downstream pressure, designated LP in FIG. 4. By virtue of the fluid passage generally designated 105, the low pressure LP is also seen at the exposed portions 106 of the upper end cap 44.

With that arrangement, the high pressure HP creates a force suggested by arrow 110 which presses the resilient flange 100 of the radial seal against the flange 103 in order to enhance sealing. In addition, the high pressure HP at the periphery 46 of the filter juxtaposed with the lower pressure LP at the portion 106 of the end cap creates a force signified by arrow 112 which places the filter media 41 in tension. The high pressure zone HP acting against the low pressure zone LP in the chamber 81 also creates a compressive force on the filter media 41. However, the inner periphery 42 of the filter element closely fits over the supporting permanent center tube 66 to support the filter media and thereby prevent crushing in the radial direction.

Attention will briefly be focused on the condition when the filter plugs. When the filter plugs, there is no flow or very low flow through the filter media 41, and the pressure LP in the chamber 81 drops to a very low level, whereas the pressure HP in the external chamber raises to the maximum which can be produced by the pump. The radial forces on the filter media 41 continue to be resisted by virtue of the support tube 66. The high pressure also serves to maintain the radial seal 100 in contact with the flange 103. If a portion of the end cap 44 were also exposed to high pressure, such as by positioning the seal 102 further toward the inside of the filter, at a point intermediate its inner and outer peripheries as has been conventional, there would be high pressure at an external portion of the end cap and low pressure at an internal portion of the opposite end cap, creating an axial compressive force on the filter. That force might reach 200 psi in a plugged filter condition if no relief valve were present. In accordance with the invention, however, placing the radial seal 100 at the outer periphery and configuring the arrangement so that the entire exposed portion 106 of the end caps are maintained in a lower pressure environment, causes all of the forces across the paper media to be in tension, which can be relatively readily withstood by the filter media, thereby maintaining the integrity of the filter system.

As a subsidiary feature of the invention, the housing section 40 which supplies oil to the filter is provided with a flow diverter 120 (see FIG. 4) which diverts flow from the inlet port 33 into the external chamber 80 while preventing direct flow from impinging on the lip 101 of the radial seal. Thus, without the flow diverter 120, oil rushing through the inlet port 33, for example on startup, would tend to impinge on the radial seal 100 at the junction between the nose 101 and the point where it joins the flange 102, creating a force which would tend to lift the seal in high flow conditions. By positioning the flow diverter 120 to direct flow into the chamber but not directly on the interface between the radial seal and its mating flange, this potential source of filter leakage is avoided.

Referring now concurrently to FIGS. 2 and 5, the opposite sealing arrangement will be briefly described. It is seen that the lower end cap 45 is of molded potting compound just as the upper end cap, and has a radial seal gasket 51 attached to the potting compound during formation, to form a filter cartridge which has an integral end cap and radial seal 51. The support plate 65, which supports the permanent center tube 66, also has a cylindrical flange or wall 125 which mates an internal cylindrical surface 126 of the radial seal 51. The radial seal 51 is preferably formed identically to the radial seal 50, and will function as described in detail above. The low pressure LP and high pressure HP zones (with respect to the filter cartridge) are indicated by appropriate letters in FIG. 5.

A noteworthy feature of a filter system according to the present invention, in addition to the superior performance and characteristics described in detail above, is the simplicity of installation which results in foolproof installation without danger of an incorrect or faulty installation. More particularly, the filter cartridge is rendered unidirectional (with respect to the direction of insertion into the filter housing) by associating with the filter cartridge a housing gasket, and locating such gasket for ready and automatic installation between the mating elements of the housing when those elements are assembled. Thus, as will be seen in FIG. 1, a plurality of segmented flexible links or connectors 130, formed of the same material as the radial seal, such as nitrile rubber, are disposed around the periphery of the filter and join the radial seal portion 50 to a housing gasket 53. The links 130 support the gasket 53 displaced from the outer periphery of the filter cartridge. The diameter of the thus-suspended gasket 53 is greater than the inner diameter of the shell 61, thus preventing the upper portion of the filter from being inserted into the housing 60. It will thus be apparent that the filter will be inserted into the housing in one direction only, with the end carrying the suspended gasket 53 the last to enter the housing.

Significantly, when the filter cartridge is inserted in that way, the gasket 53 overlies a shoulder 132 formed in the shell 61. It will be seen in FIGS. 2 and 4 that the shell 61 has a reverse formed flange 134 at the upper end thereof, in gripping arrangement with a cylindrical tab 136 of threaded ring member 137. The ring member 137 is threaded at 70 (as noted above) to form threads which engage mating threads 72 formed in a lower portion 138 of the housing 30. A series of cutouts 140 formed in the threaded ring member 137 provide interfitting portions 141 over which the lip of the housing is swaged to prevent the ring from rotating with respect to the housing. When the housing 60 with inserted filter cartridge is brought into position with respect to the fixed housing 30, the gasket 53 is in appropriate position, without the need for finger manipulation or the like, so that when the threads 70, 72 are engaged and tightened, the gasket 53 automatically seats to provide a seal between the shoulder 132 of the shell and an internal cylindrical sealing surface 140 of the housing 30.

In short, flexible links support a housing gasket in position with respect to the filter and provide two functions. First, they make it impossible to insert the filter into the housing in the wrong direction. Secondly, they hold the suspended gasket in appropriate position so that when the housing is brought into engagement with the base plate, the axial gasket is automatically placed in the correct position, without the need for finger manipulation. As a result, when the housing is rotated to engage the mating threads and tighten the filter assembly for use, the gasket is automatically seated.

The use of radial seals on a filter element for sealing the internal chambers facilitates the use of a simple axial seal as a housing seal. The use of an axial seal, instead of a radial seal, as a housing seal is also of significance. If a radial seal were used, as is done in some implementations, it is found that the torque needed to remove the housing from the base can be very great. However, in accordance with the present invention, the manner in which the internal chambers are sealed allows the use of a simple axial seal for a housing gasket. As such, the gasket, which is self-aligning, is brought into compression only for the last fractional turn of the housing. The gasket is in compression only, and when it is desired to remove the housing to change the filter, only a reasonable amount of torque need be applied to the housing, and almost immediately upon turning, the gasket releases its holding power and allows the cover to be removed with relative ease.

Figure 6:
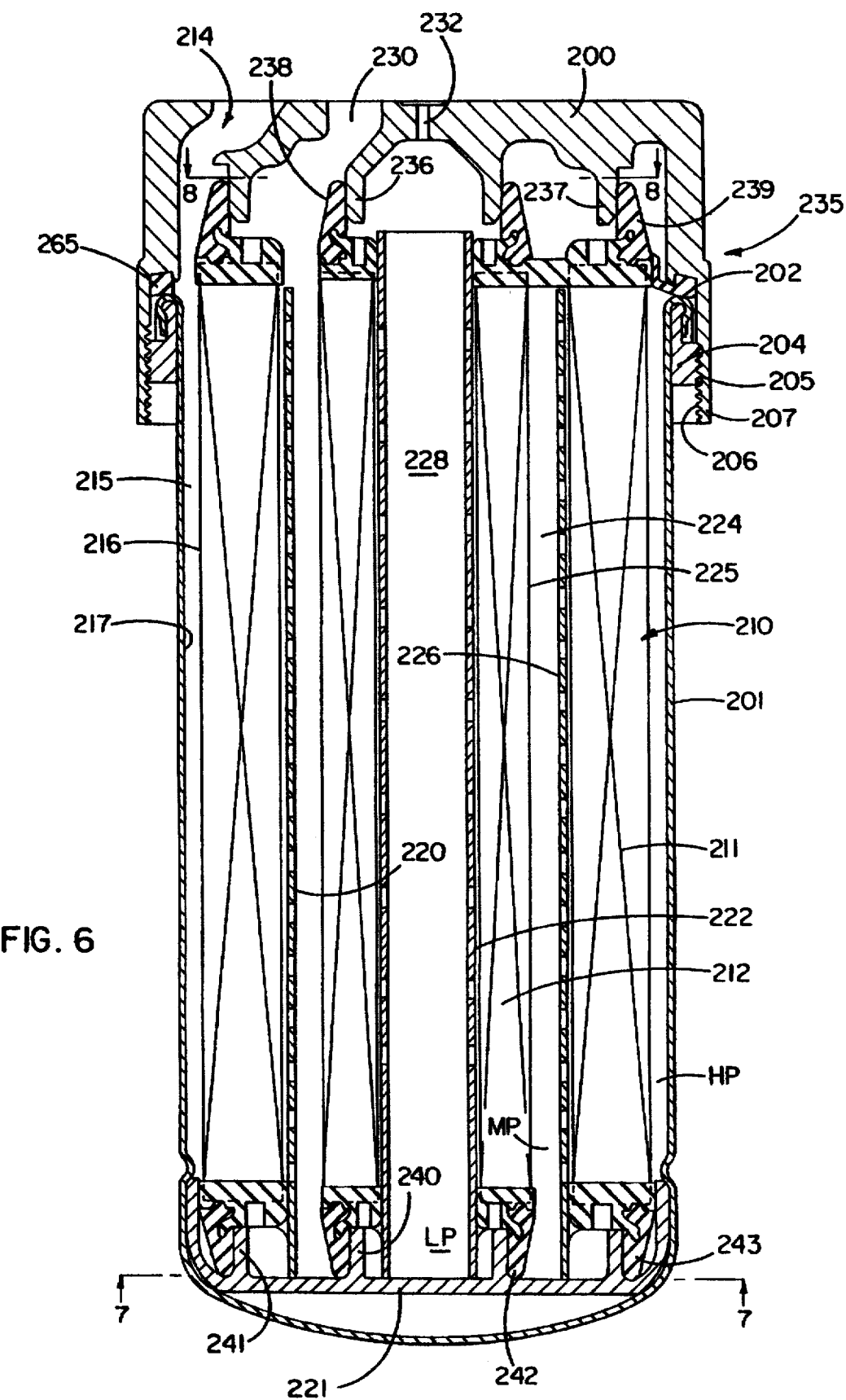
FIG. 6 is a sectional view of another embodiment of a filter system in accordance with the present invention, particularly suited to retrofit applications of the dual flow filter type.

Turning to FIG. 6, there is shown a further embodiment of the present invention. Like the embodiment of FIG. 1, it is intended primarily as a retrofit version. A mounting base 200 is provided for attachment to an engine, and a cylindrical canister 201 is provided for supporting a filter cartridge and for attachment to the base 200. The housing 201 is of sheet metal, like the FIG. 1 embodiment, and has a rolled flange 202 near the open end thereof, trapping a cylindrical threaded ring 204 carrying threads 205 which mate with threads 206 in the lower portion 207 of the base plate 200. A filter cartridge generally indicated at 210 is inserted within the housing, following which the housing 201 is secured to the base 200.

In contrast to the FIG. 1 embodiment, the FIG. 6 embodiment filter system is of the dual flow type as described in commonly owned Brown et al U.S. Pat. No. 5,342,511 and in Cudaback et al U.S. Pat. No. 5,078,877. Such filter includes two cylindrical coaxial filter elements, a first larger filter element 211 disposed in surrounding relationship to a second internal smaller circumference filter element 212. Primary flow to the filter is through an inlet port 214 to a cylindrical chamber 215 formed between the outer periphery 216 of filter element 211 and the inner wall 217 of the shell 201. A perforated center tube 220 carried by an end member 221 fits within the inner periphery of the filter element 211 for internal support. The internal filter element 212 is supported on a separate permanent center tube 222 also carried by the end plate 221. A cylindrical chamber 224 formed between the outer periphery 225 of the smaller cartridge 212 and the inner periphery 226 of the center tube 220 provides a lower pressure chamber 224. In this case, the pressure is lower than the high pressure in the chamber 215, but higher than the pressure in an inner chamber 228 formed within the internal center tube 222. The various chambers are designated LP for low pressure, MP for medium pressure and HP for high pressure. It will be appreciated, however, that the medium pressure is generically a lower pressure chamber with respect to the high pressure chamber, and at the same time is a higher pressure chamber with respect to the low pressure chamber.

Flow through the filter is via inlet port 214 through the outermost filter element 211 to the chamber 224. An outlet port 230 provides an outlet from the chamber 224, which is the main source of filtered oil for the engine. Further flow, however, is also through the inner filter element 212 to the inner chamber 228 and out a smaller restricted port 232 for return directly to the crankcase.

In practicing the invention, each of the filter elements 211, 212 is provided with a pressure sealing arrangement adapted to maintain the higher pressure zone at the outer periphery of the filter element, and the lower pressure zone at the inner periphery as well as at the end caps thereof. Thus, and as described in connection with the previous embodiment, each of the individual filter elements has high pressure forces adapted for sealing the gasket arrangement, provides radial forces on the filter media which are supported by permanent center tubes, and in the axial direction, in which the filter cartridge has no direct support (by virtue of the slide-on fit over the permanent center tube), the forces imposed on the filter media are in tension.

Thus, referring to the interfitting relationship between the upper portion 235 of the filter cartridge and the base plate 200, it will be seen that the base plate 200 carries a pair of cylindrical flanges 236, 237. It will also be seen that the inner filter section 212 carries a radial seal 238 having a cylindrical inner periphery adapted to mate with the flange 236. Similarly, the outer filter element 211 carries a radial seal 239 having an inner periphery adapted to mate in sealing relationship with the flange 237.

Referring to the lower portion of the filter, the domed end of the can contains a support plate 221 which carries the pair of permanent center tubes 220, 222. In addition, the support plate is formed with a pair of sealing cylindrical flanges 240, 241. The flange 240 mates with radial seal 242 and the flange 241 mates with radial seal 243.

Also as described in connection with the previous embodiment, the gaskets which form the radial seals are attached to the ends of the filters by end caps. Preferably the end caps are potted members of an environmentally acceptable potting compound, which securely embeds the associated pleats of the filter media and also captures flange members of the associated gaskets, to form integral sealing gaskets attached to the end caps at the outer peripheries of the respective filter elements.

Figure 7:
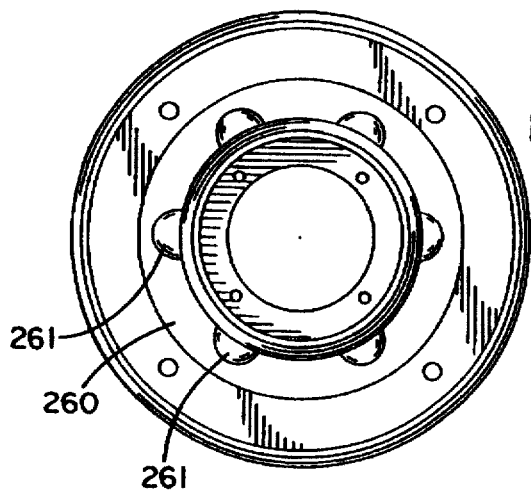
FIG. 7 is a bottom view of the filter cartridge (removed from its housing) taken generally along the line 7—7 of FIG. 6.
Figure 8:
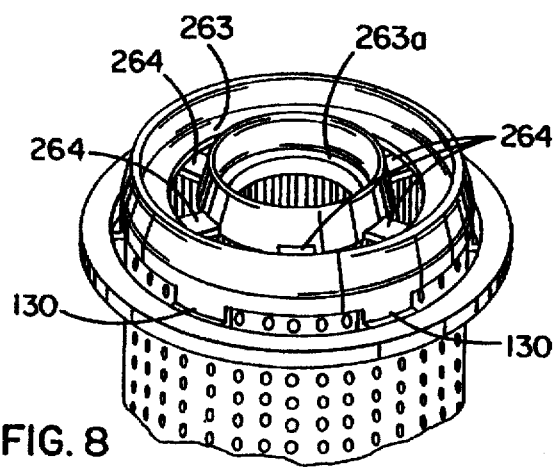
FIG. 8 is a perspective view taken generally along the line 8—8 of FIG. 6, and showing the integral suspended housing gasket assembly.

For purposes of providing a unitary filter cartridge having two filter elements, special gasketing and attachment techniques are utilized as illustrated more fully in FIGS. 7 and 8. FIG. 7 is a view of the filter cartridge removed from its housing, and taken generally along the line 7—7 of FIG. 6. It shows that the filter media has a zone 260 created between the inner periphery of the outer filter and the outer periphery of the inner filter. Angularly spaced lugs 261, formed of the same potting material which forms the end caps 262, 262a, are formed about the periphery of the inner filter element, and extend radially outwardly in order to maintain separation between the two filter elements in the zone 260. These lugs help to get the inner element lined up with the center tube in the case where the filter is mounted horizontally or somewhat off vertical. If these lugs were not present, the inner element might "sag" and bump against the end of the bypass center tube and prevent axial insertion of the cartridge.

FIG. 8 shows the opposite end which has the end cap between the two filter elements formed with web-like connectors 264 which attach the end cap 263 of the outer filter element to the end cap 263a of the inner filter element. Thus, at the upper end of the filter, the two filter elements are attached together rather securely by means of the interattached links 264. Gaps between the links allow flow through the filter as is needed. It is worthy of note that the full flow center tube is made shorter than the bypass center tube in order to leave axial space for the connectors between the full flow and bypass filters, and to force the concentric elements to self-align for easy insertion. At the opposite end of the filter, the links tend to have enough rigidity to support the inner filter element out of contact with the inner periphery of the outer filter element. However, the spaced lugs 261 serve further to maintain the spacing between those elements. The lugs are preferable tapered so that the inner filter element is centered as the filter is inserted over the pair of support tubes (see FIG. 7) as the two-element filter cartridge is inserted into the housing 201.

Like the filter cartridge of FIG. 2, the composite filter cartridge of the FIG. 6 embodiment also carries a cylindrically supported housing seal 265. The seal, as in the previous embodiment, makes the filter insertion unidirectional, and at the same time makes the positioning of the gasket 265 automatic, so that when the canister is brought to the housing and rotated, the filter system is secured in place with the gasket automatically positioned to provide the appropriate seal.

The two filter system embodiments described thus far have been designated as retrofit filter assemblies, because they are readily adaptable to placement on existing engines in place of conventional filters. The full flow filter of FIG. 2 is readily positionable over a spud, and secured with a lock nut. The axial extent from the engine is limited, and the cartridge and center tube are all contained within a metallic housing which can be manually manipulated into position at the base plate from almost any angle. When in final position, the housing must, of course, be coaxial with the base plate, so that the threads can be engaged and the filter secured in place. However, until that point, the filter housing with inserted filter cartridge can be pivoted and manipulated around obstructing engine component in order to be brought into alignment.

The dual flow filter of FIG. 6 uses a separate casting 200, which bolts to an engine in place of a conventional external thread casting normally used to mount a spin-on filter to the engine. The bolts attaching the casting 200 to the engine are not shown for the sake of simplicity. The separate casting concept is used in the dual flow filter because it is more practical and much simpler, and results in a shorter overall filter length when compared to the external thread on the existing casting. Much of this is due to the more complex flow geometry of the dual flow filter.

Advantages can be achieved in applications where the design and placement of the filter assembly will allow the filter cartridge to be inserted along an axial path directly into a filter housing permanently attached to the engine. In such applications, the permanent housing can be closed by a simple cover; the filter housing, permanent center tubes, and related structure can be permanently mounted on the engine. In that case, only a small and relatively lightweight portion of the filter housing need be removed, i.e., the cover, and the rest of the filter system remains a part of the engine. Such an arrangement is advantageous not only for ease of access and the simplicity of removal and reinstallation, but also because the portions which are removed from the engine are a relatively minor part of the overall assembly, requiring less cleanup work on the mechanic's part.

An example of such an arrangement for a full flow filter is illustrated in exploded perspective in FIG. 9. There is shown in schematic form an engine block 300 carrying a filter housing 302, preferably of sheet metal. A permanent center tube 303 is mounted within the housing to a base plate 301 (FIG. 10), and forms a permanent part of the housing. The housing itself carries a threaded flange 304 for attachment to complementary threads on a cover.

A filter cartridge 310 is provided, having a sealing arrangement which isolates the end caps and inner periphery from high pressure at the outer periphery. The cartridge fits into the housing 302 and over the permanent center tube 303. Finally, a metal cover 311, preferably of cast metal, such as cast aluminum, is provided, having an internal threaded section 312 adapted to mate the threads 313 in the cylindrical flange 304. The filter cartridge 310 carries a suspended axial gasket 317, for automatically sealing the housing when the cover is tightened. The filter assembly 310, as in the other embodiments, has no supporting center tube, and relies for radial support on the center tube 303 of the housing. The lack of axial support is compensated by loading of the filter element in tension rather than in compression, as in the previous embodiments. As a final feature, the end cap 311 may be provided with a drain plug 318 to allow the oil within the filter cartridge to be drained before the cover 312 is removed.

Figure 12:
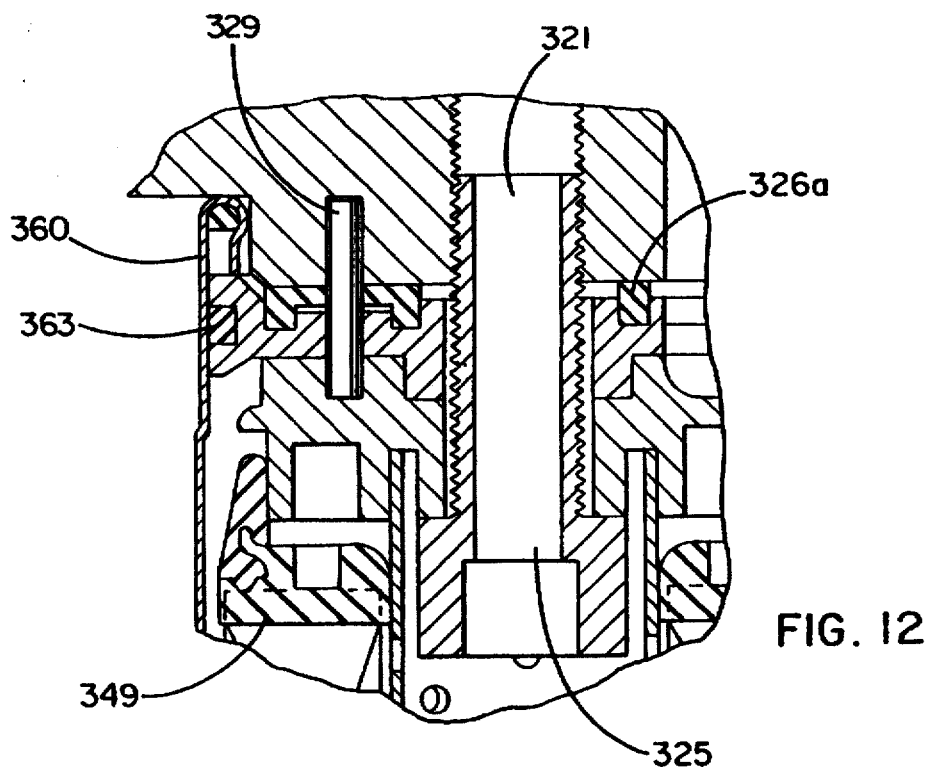
FIG. 12 is an enlarged sectional view showing the anti-rotation pin of the filter system of FIG. 10.

Referring in greater detail to FIG. 10, there is shown in partly schematic form the primary elements of an engine mounting area which can include a raised cylindrical section 320 which can be very simply machined to include one or more cored openings 322 for inlet oil flow to the filter, a central opening 321 for outlet oil flow to the engine, and a tapped hole in the opening 321 for securing the filter assembly thereto. A specially configured internal socket head bolt 324 is provided having a central opening 325 therein to allow passage of oil through the bolt while the bolt secures the housing to the engine block. A gasket 326 with barbed posts 327 fitting within apertures 328 in the base plate 301 provides appropriate sealing of the filter housing to the engine block. The engine to housing gasket 326 provides a pair of sealing rings 326a, 326b which fluidically connect the aperture 322 in the engine block to an inlet port 340 in the base plate 301. An anti-rotation pin 329 (FIG. 12) secured to the base plate 301 and fitting within a cored aperture in the engine housing, is provided for preventing rotation of the filter housing when once properly installed on the engine.

Not unlike the base plate of the prior embodiments, the base plate 301 includes a cylindrical flange 330 sized to mate with a flattened surface 331 of a radial seal 332. The radial seal has a rounded nose 333 for facilitating insertion of the filter element into the housing. A flow diverter 341 in the inlet port diverts the flow into an outer cylindrical chamber 342 while avoiding direct impingement onto the interface 343 between the nose 333 of the radial seal and the flange 332 of the housing. As in the prior embodiment, a high pressure zone in the outer cylindrical chamber 342 forces flow to a lower pressure zone LP in the central cylindrical chamber 345 within the permanent center tube 346. It will also be seen that the low pressure zone LP appears at the upper surface 348 of the end cap 349 formed in the filter element 310.

As will be best appreciated from FIG. 10, the permanent center tube 303 is fixed within an aperture 350 of the base plate 301. Similarly, the cylindrical shell 305 has a rolled flange 360 at the base thereof to capture an internal flange 361 formed in the end plate. Thus, the cylindrical shell is securely affixed to the end plate. An O-ring or square cross-section round gasket 363 prevents leakage between the high pressure zone 342 into the lower portion of the housing.

It is a significant feature of the embodiment of FIG. 10 that one of the seals associated with the filter cartridge 310 is an axial seal, and is configured to also isolate the high pressure zone at the periphery of the filter from the lower pressure zones at the end caps and within the filter. In the configuration illustrated in FIG. 10 and in greater detail in FIG. 11, it will be seen that the lower end cap 370 of the filter cartridge 310 has a flat surface 371 formed in a planar surface thereof and adapted to mate with a planar surface 372 of the cover assembly 311. A continuous flexible ring 375 having one end secured in the end cap 370 carries a suspended gasket 376. In this embodiment, the space between the end cap employing an adaptor 371 and the planar surface of the lid 372 is exposed to the downstream filter pressure of the engine, whereas the opposite side of the end cap 370 is exposed to the upstream filter pressure of the engine. Thus, a pressure differential exists across the end cap which creates a force pushing the end cap 370 against the lid 311. This approach is significant because it allows the elimination of the radial seal on one side of the filter. The elimination of the radial seal in this embodiment allows the cover of the housing to be removed without the necessity for exerting undue torque and simplifies the overall design. If a radial seal were used, the radial seal would resist removal of the cover for a significant portion of the travel of the cover as the mating threads are disengaged.

Figure 11:
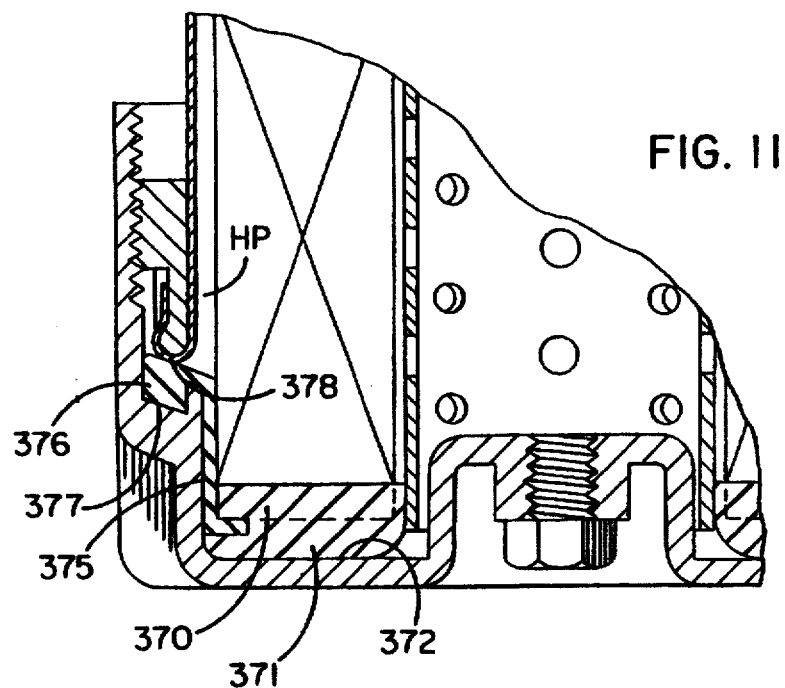
FIG. 11 is an enlarged sectional view showing the end cap and axial seal of the filter system of FIG. 10.

It will be seen from FIGS. 10 and 11 that the arrangement has provided therewith a suspended housing gasket 376, configured much like the embodiments described above. However, in the case of the present embodiment, there is no need to make the suspension ring 375 for the axial gasket 376 in a segmented form, since no flow through that section is desired, and indeed it is desirable to prevent flow through that section. Thus, the seal 376 is carried at the appropriate point to interfit between a sealing surface 377 of the cover and a shoulder 378 of the housing, so that the seal is complete upon replacing the cover.

Figure 13:
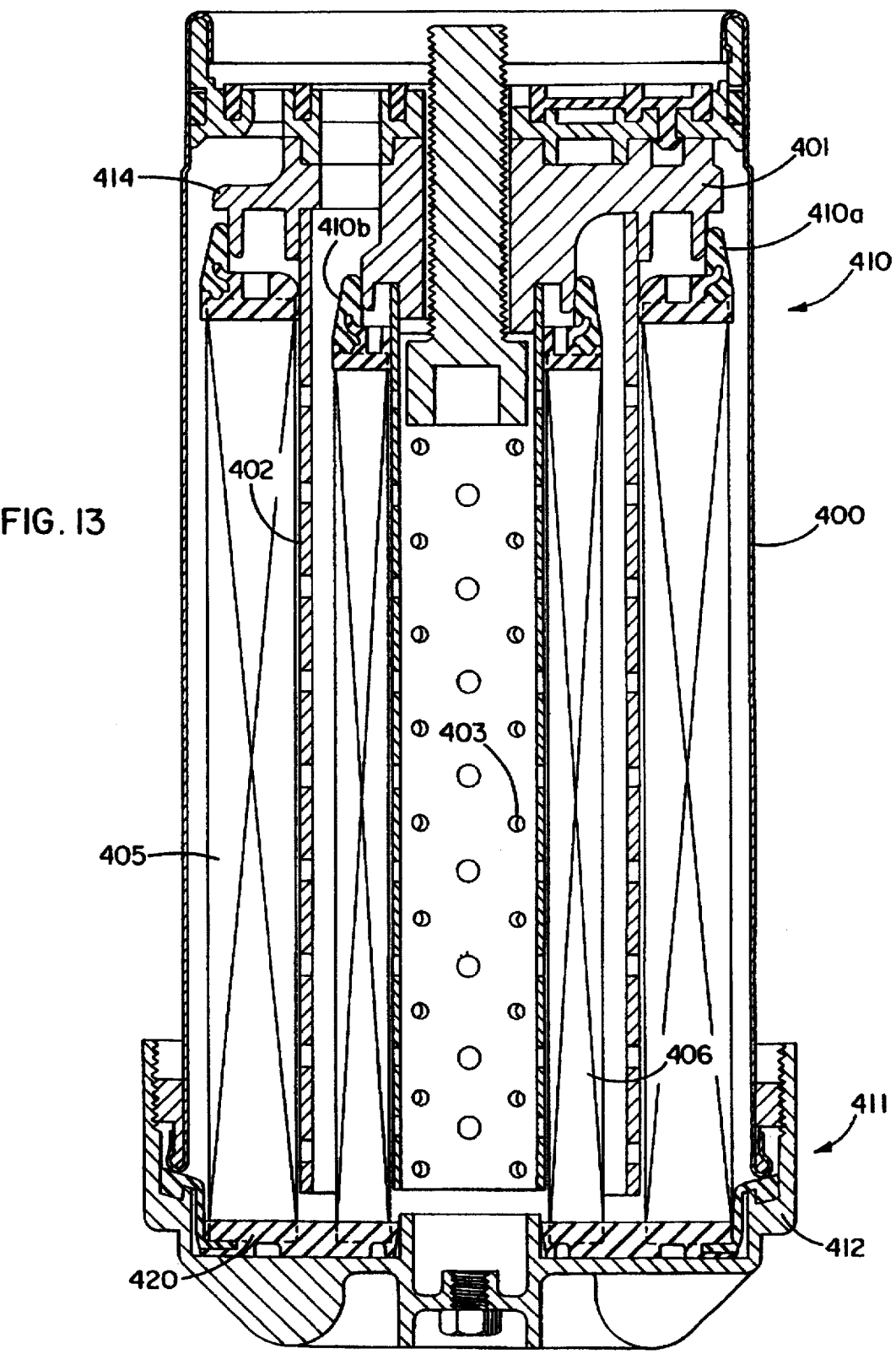
FIG. 13 is a sectional view taken through the center line of a filter of yet another embodiment of the present invention intended primarily for first-fit or OEM applications requiring dual flow filters.

A final embodiment of the present invention is illustrated in FIG. 13, and will be described only briefly. It is similar to the FIG. 10 embodiment in that it is an OEM version in which a housing 400 is mounted to a base plate 401 which carries supporting center tubes. In this case, however, there are two supporting center tubes 402, 403 carried in the base plate. The filter assembly has two concentric cylindrical filters 405, 406, similar to the embodiment of FIG. 6. One difference between those embodiments, however, is that the filter arrangement of FIG. 12 contains one set of radial seals at the cartridge end 410 and a second set of axial seals at the cartridge end 411. The end caps 420 at the end 411 which contains the axial seal are continuous cylindrical rings which join both filter elements 405, 406 and provide an imperforate unitary end cap 420 which loads the filter cartridge in a direction to enhance the axial seal. Thus, like the embodiment of FIG. 10, the sealing arrangement provides an axial force in the housing of FIG. 12 which forces the axial seals at end 411 into engagement. The high pressure in the outer peripheral zones, like the FIG. 6 embodiment, enhances the effectiveness of the radial seals 410a, 410b. A flow diverter 414 prevents direct impingement on the radial seal 410a. Without further elaboration, due to the similarities pointed out, the structure and operation of the filter of FIG. 12 will now be apparent.

It will be clear that what has been provided is an improved filter system which includes the combination of a disposable filter cartridge and a housing specially adapted to cooperate with that filter cartridge. The filter cartridge has no supporting center tube, in the preferred embodiment it is simply a pleated paper filter which may be overwrapped with paper. The ends are preferably potted of a material which is incineratable, and which is also suitable for landfills. The gasketing elements can be formed of the potting material, but in the preferred embodiment are preferably of nitrile rubber, having gripping elements which are molded into the potting end cap material. The nitrile rubber is also suitable for landfills and also can be incinerated.

The filter cartridge thus contains no metal, and nothing which is toxic when incinerated. The filter is readily crushable with light pressure, and used filters can be crushed in a relatively simple apparatus to remove residual oil and also to substantially reduce volume. After crushing, the filters may be suitable for landfill or for incineration, as desired. The absence of a supporting center tube, normally associated with such filters, is a very significant element in rendering the filters suitable for environmentally friendly disposal.

However, the absence of the supporting center tube is compensated for by the special configuration of the filter cartridge in combination with the sealing arrangement of the housing. At least one end of the filter cartridge is provided with radial seals positioned at the outer periphery of the filter in order to separate a high pressure outer peripheral zone from lower pressure zones at the internal portion of the filter and also at the end caps. The positioning and structure of the axial seals serves to assure that no portion of the end cap is in the high pressure zone. As a result of that structure, any axial forces imposed on the filter place the filter media in tension rather than in compression, and it will be found that most suitable filter media, including paper and neoprene, readily withstand the axial loads imposed.

In one embodiment of the invention, axial seals are placed at both ends of the filter housing, and flow at both ends of the filter is allowed. In another embodiment, flow at only one end of the filter is needed, and the other end is provided with an axial seal which is capable of performing the isolation function associated with the radial seal. Indeed, in that embodiment, axial forces on the filter tend to load the axial seal against its seat, preventing leakage.

Further details of the mechanical arrangement of the filter housing will be found in our concurrently filed application Ser. No. 08/575,625 entitled Oil Filter Housing (Attorney's Docket No. 64247), which describes and claims the mechanical configuration of the filter housing. Further details of the filter cartridge itself will be found in our concurrently filed application Ser. No. 08/575,833 entitled Environmentally Friendly Filter Cartridge (Attorney's Docket No. 64246), which describes and claims the filter cartridge. To the extent necessary, the description of those copending applications is incorporated here by reference. However, it will also be clear to those skilled in the art that adequate detail of the invention has been provided herein to enable one skilled in the art to practice the present invention.

It is worthy of note that the present filter is suitable for use not only in automotive oil filter applications, but in other more stringent applications as well. Indeed, in automotive applications, the present filter can be used without the need for providing high pressure relief valves if so required. In addition, in other applications, such as diesel fuel filters, or hydraulic filters, no overload valve is permissible. In these applications, if the filter begins to plug, it is preferable to degrade performance of the machine so that the filter is changed, rather than bypass the filter and risk damaging expensive equipment. However, using conventional unsupported filter media in such applications is ineffective, because, without the bypass valve, the filter would likely be crushed by high pressures encountered in a plugged filter operation, and that would clearly result in damage to the equipment.

According to the present invention, there is no substantial danger of such damage, because the filter is configured in the manner described above so that all radial loads on the filter are supported by the permanent center tube, and all axial loads place the filter media in tension so that any axial loads imposed on the filter media in a plugged filter condition will be readily withstandable by the filter cartridge.

What is claimed is:

1. A filter system employing a crushable filter cartridge, and comprising in combination:

a two piece housing configured to be openable to replace the filter cartridge, and closable for filtering, a cylindrical filter cartridge having filter media defining an inner cylindrical bore and an outer cylindrical periphery, wherein said inner cylindrical bore and said outer cylindrical periphery coaxially surround a central axis, said filter media having first and second ends spaced apart along said central axis, said filter cartridge including first and second end caps attached to the filter media at said first and second ends thereof, respectively, said housing including a filter inlet and a filter outlet for directing flow through the filter cartridge from a higher pressure upstream side at the outer periphery to a lower pressure downstream side at the cylindrical bore, the filter cartridge having no integral center support tube permanently attached thereto, the housing having a support tube fluidly connected to said filter outlet and sized to closely fit into the cylindrical bore, the support tube radially supporting an inside surface of the filter cartridge upon insertion into the cylindrical bore, sealing means for sealing each end cap of the filter cartridge with opposite ends of the housing, wherein said sealing means is arranged to apply fluid pressure from said higher pressure upstream side to high pressure areas heated at axially inner faces of said end caps and to apply fluid pressure from said lower pressure downstream side to low pressure areas located at axially outer faces of said end caps, wherein fluid pressure from said higher pressure upstream side applies first forces on the high pressure areas of said end caps so as to bias said end caps axially away from one another, wherein fluid pressure from said lower pressure downstream side applies second forces to the low pressure areas of said end caps so as to bias said end caps axially toward one another, and wherein respective magnitudes of said first forces are greater than respective magnitudes of said second forces to exert a tension force on the filter media along said central axis of the filter cartridge, the sealing means including a radial seal gasket on at least one end of the filter cartridge, said radial seal gasket having a peripheral sealing surface that sealingly abuts a cylindrical peripheral surface defined by an upstanding cylindrical wall in the housing to form a radial seal therewith.

2. The combination as set forth in claim 1 wherein the filter cartridge has a radial seal gasket at each end cap thereof, and separate upstanding cylindrical walls are formed in the housing at each end for cooperating with the respective radial seal gaskets.

3. The combination as set forth in claim 2 wherein the filter inlet is provided at one end of the housing, and a flow diverter is positioned at said one end of the housing to direct fluid flow into the upstream side while diverting flow from direct impingement on the radial seal gasket.

4. The combination as set forth in claim 1 wherein the second end cap has an integrally attached imperforate axial seal cooperating with a facing surface in a cover of the housing, said first force biasing the second end cap into contact with the facing surface in the cover.

5. The combination as set forth in claim 1 wherein the housing comprises a removable shell having the center tube fixed therein and adapted to receive the filter cartridge upon insertion into the shell over the center tube, a flange and threads at a base of the shell for securing and mating the shell with a housing base plate, and a gasket suspended from the filter cartridge and positioned so that it is compressed between the flange and the baseplate when the shell is assembled to the base plate for sealing the filter system.

6. The combination as set forth in claim 1 wherein the housing comprises a base adapted to be secured to an engine, an open-ended cylindrical housing affixed to the base, the base supporting the center tube, and a cover threadably secured to the housing and removable to replace the filter element, the cover and housing having mating flanges about their respective peripheries, and a suspended gasket carried by the filter cartridge and interposable between the flanges when the filter is inserted in the housing for sealing the filter assembly when the cover is secured.

7. The combination as set forth in claim 1, wherein the filter cartridge comprises two concentric cylinders of filter media including an outer cylinder surrounding an inner cylinder, the outer cylindrical periphery being the outside of the outer cylinder, and the cylindrical bore being on the inside of the inner cylinder, an intermediate region between said concentric cylinders, whereby flow from the outer periphery to the cylindrical bore creates a zone of intermediate pressure in the intermediate region, neither cylinder having an integral supporting center robe incorporated therein, said support tube of the housing having a pair of coaxial center robes sized for insertion into and support of the respective cylinders, said sealing means comprising a pair of radial seals on at least one end of the filter cartridge cooperating with a pair of cylindrical walls in the housing.

8. The combination as set forth in claim 7 wherein the filter cartridge has a pair of radial seals at each end thereof, and separate pairs of cylindrical flanges are formed in the housing at each end for cooperating with the respective pairs of radial seals.

9. The combination as set forth in claim 7 wherein the second end cap has an integrally attached imperforate axial seal and is attached to both said cylinders and cooperates with a facing surface in a cover of the housing, said first force biasing the second end cap into contact with the facing surface in the cover.

10. The combination as set forth in claim 7 wherein the first end cap on the first end of the filter cartridge comprise coaxial end caps, a first fixed to the filter media of the inner cylinder and a second fixed to the filter media of the outer cylinder, the first and second coaxial end caps having no connection therebetween so as to allow insertion of the filter into the housing over said pair of coaxial center tubes, the second end of the filter cartridge having second end caps secured to the respective cylinders and including joinder means between the end caps for holding the inner cylinder within but out of contact with the outer cylinder.

11. The combination as set forth in claim 10 wherein connecting means connects the end caps on said second end to prevent flow past the second end of the cartridge, said connecting means serving to create a pressure differential forcing the second end cap of the filter cartridge against the adjacent housing.

12. The combination as set forth in claim 10 wherein said second end cap of the filter cartridge includes an axial seal and includes an imperforate planar surface.

13. The combination as set forth in claim 10 including a plurality of links joining the end caps at the first end of the filter, the links connecting the end caps but leaving spaces therebetween to allow flow past the cylinder ends at the second end of the filter.

14. A filter system employing a disposable filter cartridge, and comprising in combination:

a two piece housing configured to have a fixed portion and a removable portion, a cylindrical filter cartridge sized to fit within the housing, the cylindrical filter cartridge having filter media defining an inner cylindrical bore and an outer cylindrical periphery, wherein said inner cylindrical bore and said outer cylindrical periphery coaxially surround a central axis, said filter media having first and second ends spaced apart along said central axis, end caps attached to the filter media at said first and second ends thereof; respectively, the filter cartridge having no integral support robe permanently attached thereto, a filter inlet and a filter outlet in the housing for directing flow through the filter cartridge from a higher pressure upstream side at the outer periphery to a lower pressure downstream side at the cylindrical bore, the housing having a support robe fixed in one part thereof and fluidly connected to said filter outlet and sized to closely fit into the cylindrical bore of the filter cartridge, the support tube radially supporting an inside surface of the filter cartridge upon insertion into the cylindrical bore, sealing means for sealing each end cap of the filter cartridge with opposite ends of the housing, wherein said sealing means is arranged to apply fluid pressure from said higher pressure upstream side to high pressure areas located at axially inner faces of said end caps and to apply fluid pressure from said lower pressure downstream side to low pressure areas located at axially outer faces of said end caps, wherein fluid pressure from said higher pressure upstream side applies first forces on the high pressure areas of said end caps so as to bias said end caps axially away from one another, wherein fluid pressure from said lower pressure downstream side applies second forces to the low pressure areas of said end caps so as to bias said end caps axially toward one another, and wherein respective magnitudes of said first forces are greater than respective magnitudes of said second forces to exert a tension force on the filter media along the central axis of the filter cartridge, said sealing means including a radial seal gasket on each end of the filter cartridge, said radial seal gasket including a peripheral sealing surface that sealingly abuts a cylindrical peripheral surface defined by a cylindrical wall at each end of the housing to form respective radial seals therewith, the radial seals being positioned at the outer periphery of the filter cartridge.

15. The combination as set forth in claim 14 further including a suspended gasket carried by the filter cartridge and positioned to be interposed between the fixed and removable portions of the housing when the housing is assembled.

16. The combination as set forth in claim 14, wherein the filter media comprises two concentric cylinders of filter media defining said outer and the cylindrical bore and an intermediate chamber between the cylinders, neither cylinder having an integral center support tube incorporated therein, said support tube of the housing having a pair of coaxial support tubes sized to fit the openings of the respective cylinders for support thereof, said sealing means comprising a pair of radial seals cooperating with a pair of cylindrical walls at each end of the filter housing.

17. The combination as set forth in claim 16 further including a plurality of radial links connecting end caps at the first end of the filter cartridge thereby to support the inner cylinder within the outer cylinder, and a suspended gasket carried by the end caps at said first end and positioned to be interposed between the fixed and removable portions of the housing when the housing is assembled.

18. A filter system employing a disposable filter cartridge, and comprising in combination:

a housing having a fixed portion and a removable portion, a cylindrical filter cartridge sized to fit within the housing, the cylindrical filter cartridge having filter media positioned between an inner cylindrical bore and an outer cylindrical periphery, wherein said inner cylindrical bore and said outer cylindrical periphery coaxially surround a central axis, said filter media having first and second ends spaced apart along said central axis, end caps attached to the filter media at said first and second ends thereof, respectively, the filter cartridge having no integral support tube permanently attached thereto, a filter inlet and a filter outlet in the housing for directing flow through the filter cartridge from a higher pressure upstream side at the outer periphery to a lower pressure downstream side at the cylindrical bore, the housing having a permanent support tube fixed in one part thereof and fluidly connected to said filter outlet and for insertion into the cylindrical bore of the filter cartridge to radially support an inside surface of said filter cartridge, sealing means for sealing each end cap of the filter cartridge with opposite ends of the housing, wherein said sealing means is arranged to apply fluid pressure from said higher pressure upstream side to high pressure areas located at axially inner faces of said end caps and to apply fluid pressure from said lower pressure down stream side to low pressure areas located at axially outer faces of said end caps, wherein fluid pressure from said higher pressure upstream side applies first forces on the high pressure areas of said end caps so as to bias said end caps axially away from one another, wherein fluid pressure from said lower pressure downstream side applies second forces to the low pressure areas of said end caps so as to bias said end caps axially toward one another, and wherein respective magnitudes of said first forces are greater than respective magnitudes of said second forces to exert a tension force on the filter media along the central axis of the filter cartridge, the sealing means including a radial seal gasket on the first end of the filter cartridge, wherein said radial seal gasket includes a peripheral sealing surface that sealingly abuts a cylindrical peripheral surface defined by a cylindrical wall in the housing, the sealing means further including the second end cap at the second end of the filter cartridge having an integrally attached imperforate axial seal cooperating with a facing flange in the housing so that the first force serves to force the second end cap into contact with a facing surface of said housing.

19. The combination as set forth in claim 18 further including a suspended gasket carried by the filter gasket at the second end thereof, the suspended gasket being sized and positioned to be interposed between the fixed and removable portions of the housing for sealing of the fixed and removable portions are assembled.

20. The combination as set forth in claim 18 in which the cylindrical filter media comprises a pair of concentric cylinders with a chamber of intermediate pressure therebetween, said support tube including separate support tubes in the housing of respective diameters adapted to fit the respective concentric cylinders, a pair of radial seals at the first end cooperating with a pair of flanges in the housing for sealing the outer periphery of the respective cylinder from the pressure at the end caps thereof, the axial seal at the second end of the cartridge comprising imperforate end caps and an imperforate connection between said end caps for maintaining the axial seal in contact with the facing flange.

21. The combination as set forth in claim 20 further including a suspended gasket carried by the filter cartridge at the second end thereof, the suspended gasket being sized and positioned to be interposed between the fixed and removable portions of the housing when the housing is assembled in order to provide a seal therebetween.

* * * * *

UNITED STATES PATENT AND TRADEMARK OFFICE
CERTIFICATE OF CORRECTION

PATENT NO.   : 5,702,602
DATED        : December 30, 1997
INVENTOR(S)  : Gene W. Brown, et. al.

It is certified that error appears in the above-indentified patent and that said Letters Patent is hereby corrected as shown below:

Column 15, line 62, delete "heated" and substitute therefor --located--.

Column 16: line 57, delete "robe" and substitute therefor --tube--; line 59, delete "robes" and substitute therefor --tubes--.

Column 17, line 46, delete "robe" and substitute therefore --tube--.

Column 20, line 2, delete "gasket" (second occurrence) and substitute therefor --cartridge--.

Signed and Sealed this

Twenty-fifth Day of August, 1998

Attest:

BRUCE LEHMAN

*Attesting Officer*   *Commissioner of Patents and Trademarks*